(12) United States Patent
Peng et al.

(10) Patent No.: US 11,009,829 B2
(45) Date of Patent: May 18, 2021

(54) DUAL IMAGE STORAGE MATERIAL AS WELL AS PREPARATION METHOD AND APPLICATION THEREOF

(71) Applicant: Huazhong University of Science and Technology, Hubei (CN)

(72) Inventors: Haiyan Peng, Hubei (CN); Ye Zhao, Hubei (CN); Xiaolin Xie, Hubei (CN); Xingping Zhou, Hubei (CN); Xiaoyu Zhao, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 17 days.

(21) Appl. No.: 16/509,590

(22) Filed: Jul. 12, 2019

(65) Prior Publication Data
US 2019/0361393 A1 Nov. 28, 2019

Related U.S. Application Data (63) Continuation-in-part of application No. PCT/CN2018/094930, filed on Jul. 9, 2018.

(30) Foreign Application Priority Data

May 23, 2018 (CN) .......................... 201810503543.3

(51) Int. Cl.
*G03H 1/02* (2006.01)
*G03H 1/18* (2006.01)
(Continued)

(52) U.S. Cl.
CPC .............. *G03H 1/02* (2013.01); *C09K 11/06* (2013.01); *G03H 1/0011* (2013.01);
(Continued)

(58) Field of Classification Search
None
See application file for complete search history.

(56) References Cited

U.S. PATENT DOCUMENTS

| | | | |
|---|---|---|---|
| 4,859,572 A * | 8/1989 | Farid | G03F 7/031 430/281.1 |
| 2014/0154614 A1 * | 6/2014 | Xie | G03H 1/0248 1/248 |
| 2016/0211470 A1 * | 7/2016 | Tang | C09B 23/105 |

FOREIGN PATENT DOCUMENTS

| | | | |
|---|---|---|---|
| CN | 101329546 A | | 12/2008 |
| CN | 106950744 | * | 7/2017 |

OTHER PUBLICATIONS

Oh et al. "Holographic recording on photopolymers containing pyrene for enhanced fluorescence intensity", Macromol. vol. 41 pp. 7160-7165 (2008).*

(Continued)

*Primary Examiner* — Martin J Angebranndt
(74) *Attorney, Agent, or Firm* — Hamre, Schumann, Mueller & Larson, P.C.

(57) ABSTRACT

The disclosure belongs to the technical field of photopolymer materials, and more particularly relates to a dual image storage material as well as a preparation method and application thereof. The dual image storage material is obtained by selective photoreaction of 1 to 50 parts by weight of an organic fluorescent material, 7 to 50 parts by weight of liquid crystal, 0.2 to 10 parts by weight of a photoinitiator and 33 to 67 parts by weight of photopolymerizable monomers. The obtained dual image storage material can present a high-brightness holographic pattern under sunlight and a fluorescent pattern under ultraviolet light in the same spatial position. The presented holographic and fluorescent patterns may be the same or different. The obtained dual image storage material can be used in the field of optical anti- (Continued)

counterfeiting, optical information storage, displays or the like.

11 Claims, 1 Drawing Sheet

(51) Int. Cl.
 C09K 11/06 (2006.01)
 G03H 1/00 (2006.01)
(52) U.S. Cl.
 CPC .......... C09K 2211/1007 (2013.01); C09K 2211/1011 (2013.01); C09K 2211/1018 (2013.01); G03H 2260/12 (2013.01)

(56) References Cited

OTHER PUBLICATIONS

Liu et al. "Effect of liquid crystal concentration on lasing properties of dye-doped holographic polymer-dispersed liquid crystal transmission gratings", Appl. Phys. Lett., vol. 90 article 011109 3 pages (2007).*

Lucchetta et al., "Light amplification by dye doped holographic polymer dispersed liquid crystals". Appl. Phys. Lett., vol. 84(24) pp. 4893-4895 (Jun. 2004).*

Liu et al., "Lasing from a one dimensional photonic crystal made of a dye doped holographic polymer-dispersed liquid crystal gratings", Jap. J. Appl. Phys., vol. 45(22) pp. L559-L561 (Jun. 2006).*

Ogiwara et al., "Thermo-driven light controller by using thermal modulation of diffraction wavelength in holographic polymer dispersed liquid crystal grating" Proc SPIE 9004 article 90040Q 8 pages (Feb. 2014).*

Pogue et al., "Electrically switchable Bragg gratings for liquid crystal/polymer composites.", Appl. Spectr., vol. 54(1) pp. 12A-28A (2000).*

Ji et al. "Fabrication of flexible light shutter using liquid crystals with polymer structure", Liq. Cryst. Article 1281452 (7 pages) (Jan. 2017).*

Mei et al., "Aggregation-induced emission the whole is more brilliant than the parts", Adv. Mater., vol. 26 pp. 5429-5479 (2014).*

Feng et al., "Aggregation-induced emission enhancement of aryl-substituted pyrrole derivatives", J. Phys. Chem., vol. 110 pp. 16731-16736 (2010).*

Park et al., "High contrast fluorescence patterning in cyanostilbene-based crystalline thin films: crystallization-induced mass flow via a photo-triggered phase transition", Adv. Mater., vol. 26 pp. 1354-1359 (2014).*

Kim et al. "Holographic security media prepared form photochromic fluorescent films", Proc SPIE vol. 7118 articles 71180F (11 pages) (2008).*

Rose Bengal Dye entry of Sigma Aldrich catalog 4 pages (down loaded Sep. 2020).*

Chang et al., "Absorption and emission spectral shifts of rose bengal associated with DMPC liposomes", Dyes Pig., vol. 79(2) pp. 170-175 (Nov. 2008).*

Machine transaltion of CN106950744 (Jan. 2017).*

* cited by examiner

DUAL IMAGE STORAGE MATERIAL AS WELL AS PREPARATION METHOD AND APPLICATION THEREOF

BACKGROUND

Technical Field

The present disclosure belongs to the technical field of photopolymer materials, and more particularly relates to a dual image storage material as well as a preparation method and application thereof.

Description of the Related Art

Amorphous Alloys have,

Image storage is widely used in optical anti-counterfeiting, optical information storage, displays and other fields. Holographic technology is an effective means of image storage. The basic principle of the holographic technology is that two coherent lasers in space interfere with each other to form a grating, and both amplitude and phase information of the coherent lasers are recorded to realize three-dimensional (3D) information storage. The holographic technology can also record two-dimensional (2D) images. The holographic technology is not only widely used in data storage, distributed feedback lasers, sensors and other fields, but also plays an important role in high-end optical anti-counterfeiting since the recorded images have the characteristics of good visual effects, significant public recognition capabilities, difficult counterfeiting techniques and the like.

In the field of anti-counterfeiting, with the development of technology, the existing technologies face great challenges. In order to improve the security and monopoly of anti-counterfeiting, the development of multi-functional anti-counterfeiting technology is an effective way. Combining the holographic technology with other related disciplines to improve the anti-counterfeiting performance has become a development direction of anti-counterfeiting technology.

Optical anti-counterfeiting has the characteristic of easy identification and is the most powerful anti-counterfeiting means. Combining the holographic technology with fluorescent display technology to display two images in the same spatial position but under different conditions can realize the organic unity of overt anti-counterfeiting and covert anti-counterfeiting, and effectively improve the anti-counterfeiting ability. However, most organic fluorescent materials have an aggregation-caused quenching (ACQ) effect, that is, they exhibit a significant decrease in fluorescence brightness in a solid state. At present, there is a lack of effective dual optical anti-counterfeit image (holographic image and fluorescent image) storage materials.

SUMMARY

In view of the above-described defects or improvement requirements in the art, the present disclosure provides a dual image storage material as well as a preparation method and application thereof, and aims to provide a dual image storage material, which realizes independent display of a holographic image and a fluorescent image in the same space but under different illuminations, thereby improving the security and monopoly of anti-counterfeiting technology.

In order to achieve the above objective, according to an aspect of the present disclosure, there is provided a dual image storage material, in which in the same spatial position of the dual image storage material, a holographic pattern visible to the naked eyes is presented under sunlight, and a fluorescent pattern is presented under ultraviolet light, the holographic pattern being a two-dimensional image or a three-dimensional image.

Preferably, the dual image storage material is obtained by selective photoreaction of 1 to 50 parts by weight of an organic fluorescent material, 7 to 50 parts by weight of liquid crystal, 0.2 to 10 parts by weight of a photoinitiator and 33 to 67 parts by weight of photopolymerizable monomers.

Preferably, the photopolymerizable monomers are a mixture of monofunctional monomers and polyfunctional monomers in a mass ratio of 3:1 to 1:2; the monofunctional monomers are one or more of N,N-dimethylacrylamide, 2-hydroxyethyl acrylate, 2-hydroxyethyl methacrylate, acrylic acid and methacrylic acid; and the polyfunctional monomers are one or more of ethylene dimethacrylate, pentaerythritol triacrylate, pentaerythritol tetraacrylate, and hyperbranched acrylate.

Preferably, the organic fluorescent material is one or more of substituted 1,1,2,2-tetraphenylethene (TPE), substituted 1,2,3,4,5-pentaphenyl-1H-pyrrole, substituted 1,1,2,3,4,5-hexaphenyl-1H-silole (HPS), substituted 10,10',11,11'-tetrahydro-5,5'-bidibenzo[a,d][7]annulenylidene (THBA), substituted 9,10-di[(E)-styryl]anthracene (DSA), substituted 2,2'-(2,6-diphenylanthracene-9,10-diylidene)dimalononitrile (PDAB) and substituted benzhydrylidenefluorene, structural formulae of which are shown as follows:

substituted TPE substituted 1,1,2,3,4,5-pentaphenyl-1H-pyrrole where substituent groups R in the structural formulae of the organic fluorescent material are each independently selected from the group consisting of n-hexyl, n-amyl, citronellol group, 4'-heptyl-4-biphenylcarbonitrile, 4'-(octyloxy)-4-biphenylcarbonitrile, 4-cyano-4'-pentyl-biphenyl, and 4-butoxy-[1,1'-biphenyl]-4'-carbonitrile.

Preferably, the liquid crystal is one or more of 4'-heptyl-4-biphenylcarbonitrile (7CB), 4-cyano-4'-pentylbiphenyl (5CB), 4'-(octyloxy)-4-biphenylcarbonitrile (8OCB), 4-butoxy-[1,1'-biphenyl]-4'-carbonitrile (4OCB), biphenylcyanogen liquid crystal mixture E7 and biphenylcyanogen liquid crystal mixture P0616A.

Preferably, the photoinitiator is an ultraviolet initiator or a visible light initiator; the visible light initiator is bis(2,6-difluoro-3-(1-hydropyrrolo-1-yl)phenyl)titanocene, a mixture of 3,3'-carbonylbis(7-diethylaminocoumarin) and N-phenylglycine, or a mixture of acid red 94 (Rose Bengal disodium salt) and N-phenylglycine; and the ultraviolet initiator is a mixture of bis(2,6-dimethoxybenzoyl)(2,4,4-trimethylpentyl)-phosphine oxide and 2-hydroxy-2-methyl-propiophenone.

According to another aspect of the present disclosure, there is provided a preparation method for the dual image storage material, comprising:

(1) uniformly mixing 1 to 50 parts by weight of an organic fluorescent material, 7 to 50 parts by weight of liquid crystal, 0.2 to 10 parts by weight of a photoinitiator and 33 to 67 parts by weight of photopolymerizable monomers to obtain a precursor of the dual image storage material;

(2) packaging the precursor of the dual image storage material obtained in the step (1) in a liquid crystal cell, and irradiating it with a coherent laser to cause free radical polymerization of the photopolymerizable monomers, thereby obtaining a holographic material in which a hologram image is stored;

(3) irradiating the holographic material obtained in the step (2) with ultraviolet light through a mask to obtain a dual image storage material in which a holographic material and a fluorescence image are both stored, the mask being used for defining a pattern of the fluorescent image;

(4) postcuring the dual image storage material obtained in the step (3) by visible light or ultraviolet light to completely react the remaining photopolymerizable monomers so as to fix the images.

Preferably, the mixing in the step (1) specifically includes: performing a magnetic stirring or ultrasonic operation for 5 to 60 minutes at a temperature of 20 to 90 degrees Celsius.

Preferably, the coherent laser in the step (2) has a wavelength of 432 to 633 nanometer and an irradiation time of 10 to 50 seconds.

Preferably, the ultraviolet light in the step (3) has a wavelength of 200 to 370 nanometer, an irradiation intensity of 10 to 200 milliwatts per square centimeter, and an irradiation time of 2 to 60 minutes.

Preferably, the post-cure time in the step (4) is 5 to 60 minutes.

According to another aspect of the present disclosure, there is provided use of the dual image storage material in the field of optical anti-counterfeiting, optical information storage or displays In general, by comparing the above technical solution of the present inventive concept with the prior art, the present disclosure has the following beneficial effects.

The present disclosure successfully combines the holographic technology with fluorescent display technology to display two images in the same spatial position but under different conditions, thereby achieving the organic unity of overt anti-counterfeiting and covert anti-counterfeiting and effectively improving the anti-counterfeiting ability.

In the present disclosure, an organic fluorescent material having aggregation-induced luminescence properties is introduced and the organic fluorescent material is modified with a specific group, thereby effectively solving the influence of the introduction of a large amount of organic fluorescent material on the degree of phase separation and the modulation degree of refractive index in the holographic system. The technical solution can achieve high brightness and high contrast of the fluorescent pattern, and can also ensure that the brightness of the holographic image is not affected. The independent coexistence of the holographic image and the fluorescent image is realized, thereby achieving the storage of the dual images.

The dual image storage according to the invention not only has an important application in the field of high-end optical anti-counterfeiting, but also can be applied to the fields of optical information storage, displays and the like.

DETAILED DESCRIPTION OF THE EMBODIMENTS

For clear understanding of the objectives, features and advantages of the present disclosure, detailed description of the present disclosure will be given below in conjunction with accompanying drawings and specific embodiments. It should be noted that the embodiments described herein are only meant to explain the present disclosure, and not to limit the scope of the present disclosure. Furthermore, the technical features related to the embodiments of the present disclosure described below can be mutually combined if they are not found to be mutually exclusive.

Optical anti-counterfeiting has the characteristic of easy identification and is the most powerful anti-counterfeiting means. Combining holographic technology with fluorescent display technology to display two images in the same spatial position but under different conditions can realize the organic unity of overt anti-counterfeiting and covert anti-counterfeiting, and effectively improve the anti-counterfeiting ability. However, most organic fluorescent materials have an aggregation-caused quenching (ACQ) effect, that is, they exhibit a significant decrease in fluorescence brightness in a solid state. In order to ensure the brightness and contrast of the fluorescent image, a large amount of organic fluorescent material needs to be introduced into the holographic system, and the organic photochromic material is a good choice. However, since the organic fluorescent material has poor diffusibility and its refractive index cannot match the photopolymerizable monomer or liquid crystal in the holographic material (especially when the content of the fluorescent material is increased to a certain extent, good diffusion performance is more important), the introduction of a large amount of organic fluorescent material may have a large influence on the degree of phase separation and the modulation degree of refractive index in the holographic system, resulting in a decrease in the brightness of the hologram. Therefore, it is still a challenge to combine the holographic technology with the fluorescent display technology to increase the brightness and contrast of the fluorescent image without reducing the brightness of the hologram.

In the present disclosure, by introducing an organic photochromic fluorescent material and modifying a functional unit of the organic fluorescent material with a certain substituent, the modified organic fluorescent material can be mutually soluble with the liquid crystal in the holographic system, so that when the holographic image is formed, the micromolecular organic fluorescent material enters the liquid crystal phase with the liquid crystal micromolecules, and thus the problem of diffusion of a small amount of organic fluorescent material in the holographic system is better solved. Therefore, a small amount of organic fluorescent material can also make the fluorescent image have sufficient brightness, thereby achieving independent coexistence of the holographic image and the fluorescent image, and achieving the storage of the dual images.

The dual image storage material according to the present disclosure is obtained by selective photoreaction of 1 to 50 parts by weight of an organic fluorescent material, 7 to 50 parts by weight of liquid crystal, 0.2 to 10 parts by weight of a photoinitiator and 33 to 67 parts by weight of photopolymerizable monomers. In the selective photoreaction, 7 to 50 parts by weight of liquid crystal, 0.2 to 10 parts by weight of a photoinitiator and 33 to 67 parts by weight of photopolymerizable monomers are irradiated by a coherent laser to cause free radical polymerization of the photopolymerizable monomers so as to obtain a holographic material in which a hologram image is stored. In addition, in the selective photoreaction, the organic fluorescent material is irradiated by ultraviolet light to obtain an image storage material in which a fluorescent pattern is stored.

The present disclosure provides a preferred dual image storage material, which is obtained by selective photoreaction of 1 to 50 parts by weight of an organic fluorescent material, 7 to 50 parts by weight of liquid crystal, 0.2 to 10 parts by weight of a photoinitiator and the balance of photopolymerizable monomers.

The photopolymerizable monomers are a mixture of monofunctional monomers and polyfunctional monomers in a mass ratio of 3:1 to 1:2; the monofunctional monomers are one or more of N,N-dimethylacrylamide, 2-hydroxyethyl acrylate, 2-hydroxyethyl methacrylate, acrylic acid and methacrylic acid; and the polyfunctional monomers are one or more of ethylene dimethacrylate, pentaerythritol triacrylate, pentaerythritol tetraacrylate, and hyperbranched acrylate.

The organic fluorescent material is one or more of substituted TPE, substituted 1,2,3,4,5-pentaphenyl-1H-pyrrole, substituted HPS, substituted THBA, substituted DSA, substituted PDAB, and substituted benzhydrylidenefluorene, structural formulae of which are shown as follows. The benzene rings of the organic fluorescent material contain at least one of the following substituent groups: n-hexyl, n-amyl, citronellol group, 4'-heptyl-4-biphenylcarbonitrile (7CB), 4'-(octyloxy)-4-biphenylcarbonitrile (8OCB), 4-cyano-4'-pentylbiphenyl (5CB) and 4-butoxy-[1,1'-biphenyl]-4'-carbonitrile (4OCB). A typical organic fluorescent material has the following structural general formula, and in the formula, the R group is independently selected from the group consisting of n-hexyl, n-amyl, citronellol group, 4'-heptyl-4-biphenylcarbonitrile (7CB), 4'-(octyloxy)-4-biphenylcarbonitrile (8OCB), 4-cyano-4'-pentylbiphenyl (5CB) and 4-butoxy-[1,1'-biphenyl]-4'-carbonitrile (4OCB).

Organic fluorescent materials having these general formulae can be obtained by conventional synthesis and modification means.

substituted TPE substituted 1,1,2,3,4,5-pentaphenyl-1H-pyrrole substituted HPS substituted DSA substituted THBA substituted benzhydrylidenefluorene substituted PDAB The liquid crystal is one or more of 4'-heptyl-4-biphenyl-carbonitrile (7CB), 4-cyano-4'-pentylbiphenyl (5CB), 4'-(octyloxy)-4-biphenylcarbonitrile (8OCB), 4-butoxy-[1,1'-biphenyl]-4'-carbonitrile (4OCB), biphenylcyanogen liquid crystal mixture E7 and biphenylcyanogen liquid crystal mixture P0616A.

The photoinitiator is an ultraviolet initiator or a visible light initiator. The visible light initiator is a mixture of 3,3'-carbonylbis(7-diethylaminocoumarin) and anilinoacetic acid, a mixture of acid red 94 and anilinoacetic acid, or bis(2,6-difluoro-3-(1-hydropyrrol-1-yl)phenyl)titanocene.

The ultraviolet initiator is a mixture of bis(2,6-dimethoxybenzoyl)(2,4,4-trimethylpentyl)-phosphine oxide and 2-hydroxy-2-methylpropiophenone.

A preparation method for the dual image storage material according to the present disclosure comprises:

(1) Uniformly mixing 1 to 50 parts by weight of an organic fluorescent material, 7 to 50 parts by weight of liquid crystal, 0.2 to 10 parts by weight of a photoinitiator and 33 to 67 parts by weight of photopolymerizable monomers to obtain a precursor of the dual image storage material.

In the above step, the specific mass fractions of the monofunctional monomers and the polyfunctional monomers are determined according to the molecular weight of the above monomer and the number of carbon-carbon double bonds contained in the compound; the optimum mass fractions are such that the monofunctional monomers and the polyfunctional monomers have approximately the same number of carbon-carbon double bonds.

The photoinitiator is a photoinitiator suitable for the free radical polymerization of coherent laser excitation in step (2), for example, 3,3'-carbonylbis(7-diethylaminecoumarin) and anilinoacetic acid a mixture having a mass ratio of 1:5 to 5:1 or bis(2,6-difluoro-3-(1-hydropyrrol-1-yl)phenyl)titanocene The method of uniformly mixing includes: performing a magnetic stirring or ultrasonic operation for 5 to 60 minutes at a temperature of 20 to 90 degrees Celsius.

(2) Packaging the precursor of the dual image storage material obtained in the step (1) in a liquid crystal cell, and irradiating it with a coherent laser of 432 to 633 nanometer for 10 to 50 seconds to cause free radical polymerization of the monofunctional monomers and the polyfunctional monomers, thereby obtaining a holographic material in which a hologram image is stored. The principle of holographic imaging is that a laser beam produces two beams of coherent homologous light through a beam splitter, and one of the two beams of homologous coherent light illuminates an object to produce diffusely reflected light (referred to as object light), which then interferes with another beam of homologous laser (referred to as reference light) to form a grating, so that both phase and amplitude information of the coherent lights are recorded on the recording medium (the precursor of the dual image storage material) to realize 3D holographic information storage.

(3) Irradiating the holographic material obtained in the step (2) with ultraviolet light through a mask to obtain a dual image storage material in which a holographic image and a fluorescence image are both stored, in which the ultraviolet light has an irradiation time of 2 to 60 minutes, a light intensity of 10 to 200 milliwatts per square centimeter and a wavelength of 200 to 370 nanometer. The mask is used for defining a pattern of the fluorescent image, and is made of two materials, one of which (e.g., soda glass) passes ultraviolet light and another of which (e.g., metal) does not pass ultraviolet light, and a metal material is used on the mask to form a desired pattern, that is, a fluorescent pattern. When the holographic material is irradiated by the ultraviolet light through the mask, the ultraviolet light passing through the glass portion of the mask irradiates into the holographic material and the fluorescence of the organic fluorescent material irradiated by the ultraviolet light is quenched. Since the ultraviolet light cannot penetrate the metal material, the fluorescence of a part of the organic fluorescent material in the holographic material is not quenched, and the corresponding pattern is the same as that of the metal material on the mask, that is, the fluorescent pattern.

(4) Postcuring the dual image storage material obtained in the step (3) by visible light or ultraviolet light to completely react the remaining photopolymerizable monomers so as to fix the images. The visible light or ultraviolet light has an irradiation time of 5 to 60 minutes.

The dual image storage material according to the present disclosure has the characteristics of double anti-counterfeiting, high pattern contrast and simple fabrication. The source used has a wavelength of 432 to 633 nanometer, preferably 532 nanometer. The ultraviolet light used has a wavelength of 200 to 370 nanometer, preferably 300 nanometer.

When the dual image storage material according to the present disclosure is used for double anti-counterfeiting, in a case where the image storage material is irradiated with visible light, a holographic image may be presented, and in a case where the image storage material is irradiated with ultraviolet light, according to the light stimuli responsiveness of the organic fluorescent material, a fluorescent pattern determined in advance by the mask pattern in the image storage material can be observed through the naked eye.

Embodiments are described below.

Comparative Example 1

In the present comparative example, the image storage material was obtained by selective photoreaction of 1 parts by weight of an organic fluorescent material (TPE, R group is hydrogen atom), 50 parts by weight of liquid crystal (4'-heptyl-4-biphenylcarbonitrile, 7CB), 0.2 parts by weight of a photoinitiator and 49 parts by weight of photopolymerizable monomers.

The photoinitiator is an ultraviolet initiator which is a mixture of bis(2,6-dimethoxybenzoyl)(2,4,4-trimethylpentyl)-phosphine oxide and 2-hydroxy-2-methylpropiophenone. The photopolymerizable monomers is a mixture of monofunctional monomers (N,N-dimethylacrylamide) and polyfunctional monomers (ethylene dimethacrylate) in a mass ratio of 3:1.

A preparation method for the image storage material is as follows.

First, TPE was added to a mixed solution of monomers and liquid crystal (4'-heptyl-4-biphenylcarbonitrile, 7CB), a photoinitiator (a mixture of bis(2,6-dimethoxybenzoyl)(2,4,4-trimethylpentyl)-phosphine oxide and 2-hydroxy-2-methylpropiophenone) was added to the solution, and then ultrasonic dispersion was performed at 20 degrees Celsius for 60 minutes, so that the photoinitiator and the organic fluorescent material were uniformly dispersed in the mixed solution of the monomers and the liquid crystal to obtain a precursor of a dual image storage material.

The precursor of the dual image storage material was irradiated with a coherent laser of 432 nanometer for 10 seconds to cause free radical polymerization of the monofunctional monomers and the polyfunctional monomers so as to obtain a holographic material in which a holographic image is stored. Subsequently, the holographic material was irradiated with ultraviolet light through a mask for 2 minutes to obtain a dual image storage material in which a holographic image and a fluorescent pattern are both stored, in which the ultraviolet light has a wavelength of 200 nanometer and a light intensity of 10 milliwatts per square centimeter. Finally, the obtained image storage material was cured by irradiating it with ultraviolet light for 5 minutes to completely react the remaining photopolymerizable monomers so as to fix the images.

In the present comparative example, since the unmodified organic fluorescent material TPE was used, the organic fluorescent material and the holographic system were not mutually soluble, resulting in failure to obtain clear fluorescent and holographic images.

Embodiment 1

The dual image storage material according to the present disclosure can present a holographic pattern visible to the naked eyes under sunlight and a fluorescent pattern under ultraviolet light in the same spatial position of the material; the holographic pattern and the fluorescent pattern can be the same or different; the holographic pattern may be a two-dimensional image or a three-dimensional image, which can be observed with the naked eyes under sunlight.

The dual image storage material was obtained by selective photoreaction of 3 parts by weight of an organic fluorescent material (1,2,3,4,5-pentaphenyl-1H-pyrrole, the R group is n-hexyl), 48 parts by weight of liquid crystal (4-cyano-4'- pentylbiphenyl, 5CB), 0.4 parts by weight of a photoinitiator and 49 parts by weight of photopolymerizable monomers.

The photoinitiator is a visible light initiator which is a mixture of 3,3'-carbonylbis(7-diethylaminecoumarin) and anilinoacetic acid. The photopolymerizable monomers are a mixture of monofunctional monomers (2-hydroxyethyl acrylate) and polyfunctional monomers (pentaerythritol triacrylate) in a mass ratio of 3:1.

A preparation method for the image storage material is as follows.

First, 1,2,3,4,5-pentaphenyl-1H-pyrrole was added to a mixed solution of monomers and liquid crystal (4-cyano-4'-pentylbiphenyl, 5CB), a photoinitiator (a mixture of 3,3'-carbonylbis(7-diethylaminecoumarin) and anilinoacetic acid) was added to the solution, and then ultrasonic dispersion was performed at 25 degrees Celsius for 57 minutes, so that the photoinitiator and the organic fluorescent material are uniformly dispersed in the mixed solution of the monomers and the liquid crystal to obtain a precursor of a dual image storage material.

The precursor of the dual image storage material was irradiated with a coherent laser of 441 nanometer for 15 seconds to cause free radical polymerization of the monofunctional monomers and the polyfunctional monomers so as to obtain a holographic material in which a holographic image is stored. Subsequently, the holographic material was irradiated with ultraviolet light through a mask for 4 minutes to obtain a dual image storage material in which a holographic image and a fluorescent pattern are both stored, in which the ultraviolet light has a wavelength of 211 nanometer and a light intensity of 20 milliwatts per square centimeter. Finally, the obtained dual image storage material was cured by irradiating it with ultraviolet light for 10 minutes to completely react the remaining photopolymerizable monomers so as to fix the images.

Embodiment 2

The dual image storage material according to the present disclosure can present a holographic pattern visible to the naked eyes under sunlight and a fluorescent pattern under ultraviolet light in the same spatial position of the material; the holographic pattern and the fluorescent pattern can be the same or different; the holographic pattern may be a two-dimensional image or a three-dimensional image, which can be observed with the naked eyes under sunlight.

The dual image storage material was obtained by selective photoreaction of 5 parts by weight of an organic fluorescent material (HPS, the R group is n-amyl), 46 parts by weight of liquid crystal (4'-(octyloxy)-4-biphenylcarbonitrile, 8OCB), 0.6 parts by weight of a photoinitiator and 49 parts by weight of photopolymerizable monomers.

The photoinitiator is an ultraviolet initiator which is a mixture of bis(2,6-dimethoxybenzoyl)(2,4,4-trimethylpentyl)-phosphine oxide and 2-hydroxy-2-methylpropiophenone. The photopolymerizable monomers are a mixture of monofunctional monomers (2-hydroxyethyl methacrylate) and polyfunctional monomers (pentaerythritol tetraacrylate) in a mass ratio of 2:1.

A preparation method for the image storage material is as follows.

First, HPS was added to a mixed solution of monomers and liquid crystal (4'-(octyloxy)-4-biphenylcarbonitrile, 8OCB), a photoinitiator (a mixture of bis(2,6-dimethoxybenzoyl)(2,4,4-trimethylpentyl)-phosphine oxide and 2-hydroxy-2-methylpropiophenone) was added to the solution, and then ultrasonic dispersion was performed at 30 degrees Celsius for 54 minutes, so that the photoinitiator and the organic fluorescent material are uniformly dispersed in the mixed solution of the monomers and the liquid crystal to obtain a precursor of a dual image storage material.

The precursor of the dual image storage material was irradiated with a coherent laser of 456 nanometer for 20 seconds to cause free radical polymerization of the monofunctional monomers and the polyfunctional monomers so as to obtain a holographic material in which a holographic image is stored. Subsequently, the holographic material was irradiated with ultraviolet light through a mask for 6 minutes to obtain a dual image storage material in which a holographic image and a fluorescent pattern are both stored, in which the ultraviolet light has a wavelength of 223 nanometer and a light intensity of 30 milliwatts per square centimeter. Finally, the obtained dual image storage material was cured by irradiating it with ultraviolet light for 15 minutes to completely react the remaining photopolymerizable monomers so as to fix the images.

Embodiment 3

The dual image storage material according to the present disclosure can present a holographic pattern visible to the naked eyes under sunlight and a fluorescent pattern under ultraviolet light in the same spatial position of the material; the holographic pattern and the fluorescent pattern can be the same or different; the holographic pattern may be a two-dimensional image or a three-dimensional image, which can be observed with the naked eyes under sunlight.

The dual image storage material was obtained by selective photoreaction of 7 parts by weight of an organic fluorescent material (THBA, the R group is citronellol group), 44 parts by weight of liquid crystal (4-butoxy-[1,1'-biphenyl]-4'-carbonitrile, 4OCB), 0.8 parts by weight of a photoinitiator and 49 parts by weight of photopolymerizable monomers.

The photoinitiator is a visible light initiator which is a mixture of acid red 94 and anilinoacetic acid. The photopolymerizable monomers are a mixture of monofunctional monomers (acrylic acid) and polyfunctional monomers (hyperbranched acrylate) in a mass ratio of 12:7.

A preparation method for the image storage material is as follows.

First, THBA was added to a mixed solution of monomers and liquid crystal (4-butoxy-[1,1'-biphenyl]-4'-carbonitrile, 4OCB), a photoinitiator (a mixture of acid red 94 and anilinoacetic acid) was added to the solution, and then ultrasonic dispersion was performed at 35 degrees Celsius for 51 minutes, so that the photoinitiator and the organic fluorescent material are uniformly dispersed in the mixed solution of the monomers and the liquid crystal to obtain a precursor of a dual image storage material.

The precursor of the dual image storage material was irradiated with a coherent laser of 462 nanometer for 25 seconds to cause free radical polymerization of the monofunctional monomers and the polyfunctional monomers so as to obtain a holographic material in which a holographic image is stored. Subsequently, the holographic material was irradiated with ultraviolet light through a mask for 8 minutes to obtain a dual image storage material in which a holographic image and a fluorescent pattern are both stored, in which the ultraviolet light has a wavelength of 245 nanometer and a light intensity of 40 milliwatts per square centimeter. Finally, the obtained dual image storage material was cured by irradiating it with ultraviolet light for 20 minutes to completely react the remaining photopolymerizable monomers so as to fix the images.

Embodiment 4

The dual image storage material according to the present disclosure can present a holographic pattern visible to the naked eyes under sunlight and a fluorescent pattern under ultraviolet light in the same spatial position of the material; the holographic pattern and the fluorescent pattern can be the same or different; the holographic pattern may be a two-dimensional image or a three-dimensional image, which can be observed with the naked eyes under sunlight.

The dual image storage material was obtained by selective photoreaction of 9 parts by weight of an organic fluorescent material (DSA, the R group is 4'-heptyl-4-biphenylcarbonitrile (7CB)), 42 parts by weight of liquid crystal (4'-(octyloxy)-4-biphenylcarbonitrile, 8OCB), 1.0 parts by weight of a photoinitiator and 49 parts by weight of photopolymerizable monomers.

The photoinitiator is an ultraviolet initiator which is a mixture of bis(2,6-dimethoxybenzoyl)(2,4,4-trimethylpentyl)-phosphine oxide and 2-hydroxy-2-methylpropiophenone. The photopolymerizable monomers are a mixture of monofunctional monomers (2-hydroxyethyl methacrylate) and polyfunctional monomers in a mass ratio of 3:2.

The polyfunctional monomers are a mixture of ethylene dimethacrylate and pentaerythritol triacrylate.

A preparation method for the image storage material is as follows.

First, DSA was added to a mixed solution of monomers and liquid crystal (4'-(octyloxy)-4-biphenylcarbonitrile, 8OCB), a photoinitiator (a mixture of bis(2,6-dimethoxybenzoyl)(2,4,4-trimethylpentyl)-phosphine oxide and 2-hydroxy-2-methylpropiophenone) was added to the solution, and then ultrasonic dispersion was performed at 40 degrees Celsius for 48 minutes, so that the photoinitiator and the organic fluorescent material are uniformly dispersed in the mixed solution of the monomers and the liquid crystal to obtain a precursor of a dual image storage material.

The precursor of the dual image storage material was irradiated with a coherent laser of 478 nanometer for 30 seconds to cause free radical polymerization of the monofunctional monomers and the polyfunctional monomers so as to obtain a holographic material in which a holographic image is stored. Subsequently, the holographic material was irradiated with ultraviolet light through a mask for 10 minutes to obtain a dual image storage material in which a holographic image and a fluorescent pattern are both stored, in which the ultraviolet light has a wavelength of 254 nanometer and a light intensity of 50 milliwatts per square centimeter. Finally, the obtained dual image storage material was cured by irradiating it with ultraviolet light for 25 minutes to completely react the remaining photopolymerizable monomers so as to fix the images.

Embodiment 5

The dual image storage material according to the present disclosure can present a holographic pattern visible to the naked eyes under sunlight and a fluorescent pattern under ultraviolet light in the same spatial position of the material; the holographic pattern and the fluorescent pattern can be the same or different; the holographic pattern may be a two-dimensional image or a three-dimensional image, which can be observed with the naked eyes under sunlight.

The dual image storage material was obtained by selective photoreaction of 11 parts by weight of an organic fluorescent material (PDAB, the R group is 4'-(octyloxy)-4-biphenylcarbonitrile (8OCB)), 40 parts by weight of biphenylcyanogen liquid crystal mixture (P0616A), 1.2 parts by weight of a photoinitiator and 49 parts by weight of photopolymerizable monomers.

The photoinitiator is a visible light initiator which is bis(2,6-difluoro-3-(1-hydropyrrol-1-yl)phenyl)titanocene. The photopolymerizable monomers are a mixture of monofunctional monomers and polyfunctional monomers in a mass ratio of 4:3.

The monofunctional monomers are a mixture of N,N-dimethylacrylamide and 2-hydroxyethyl acrylate. The polyfunctional monomers are a mixture of ethylene dimethacrylate and pentaerythritol tetraacrylate.

A preparation method for the image storage material is as follows.

First, PDAB was added to a mixed solution of monomers and P0616A, a photoinitiator (bis(2,6-difluoro-3-(1-hydropyrrol-1-yl)phenyl)titanocene) was added to the solution, and then ultrasonic dispersion was performed at 45 degrees Celsius for 45 minutes, so that the photoinitiator and the organic fluorescent material are uniformly dispersed in the mixed solution of the monomers and the liquid crystal to obtain a precursor of a dual image storage material.

The precursor of the dual image storage material was irradiated with a coherent laser of 495 nanometer for 35 seconds to cause free radical polymerization of the monofunctional monomers and the polyfunctional monomers so as to obtain a holographic material in which a holographic image is stored. Subsequently, the holographic material was irradiated with ultraviolet light through a mask for 12 minutes to obtain a dual image storage material in which a holographic image and a fluorescent pattern are both stored, in which the ultraviolet light has a wavelength of 266 nanometer and a light intensity of 50 milliwatts per square centimeter. Finally, the obtained dual image storage material was cured by irradiating it with ultraviolet light for 30 minutes to completely react the remaining photopolymerizable monomers so as to fix the images.

Embodiment 6

The dual image storage material according to the present disclosure can present a holographic pattern visible to the naked eyes under sunlight and a fluorescent pattern under ultraviolet light in the same spatial position of the material; the holographic pattern and the fluorescent pattern can be the same or different; the holographic pattern may be a two-dimensional image or a three-dimensional image, which can be observed with the naked eyes under sunlight.

The dual image storage material was obtained by selective photoreaction of 13 parts by weight of an organic fluorescent material (benzhydrylidenefluorene, the R group is 4-cyano-4'-pentylbiphenyl (5CB)), 38 parts by weight of liquid crystal, 1.4 parts by weight of a photoinitiator and 49 parts by weight of photopolymerizable monomers.

The liquid crystal is a mixture of 4'-heptyl-4-biphenylcarbonitrile (7CB) and 4-cyano-4'-pentylbiphenyl (5CB).

The photoinitiator is an ultraviolet initiator which is a mixture of bis(2,6-dimethoxybenzoyl)(2,4,4-trimethylpentyl)-phosphine oxide and 2-hydroxy-2-methylpropiophenone. The photopolymerizable monomers are a mixture of monofunctional monomers and polyfunctional monomers in a mass ratio of 6:5.

The monofunctional monomers are a mixture of N,N-dimethylacrylamide and 2-hydroxyethyl methacrylate. The polyfunctional monomers are a mixture of ethylene dimethacrylate and hyperbranched acrylate.

A preparation method for the image storage material is as follows.

First, benzhydrylidenefluorene was added to a mixed solution of monomers and liquid crystal, a photoinitiator (a mixture of bis(2,6-dimethoxybenzoyl)(2,4,4-trimethylpentyl)-phosphine oxide and 2-hydroxy-2-methylpropiophenone) was added to the solution, and then ultrasonic dispersion was performed at 50 degrees Celsius for 42 minutes, so that the photoinitiator and the organic fluorescent material are uniformly dispersed in the mixed solution of the monomers and the liquid crystal to obtain a precursor of a dual image storage material.

Figure 1:
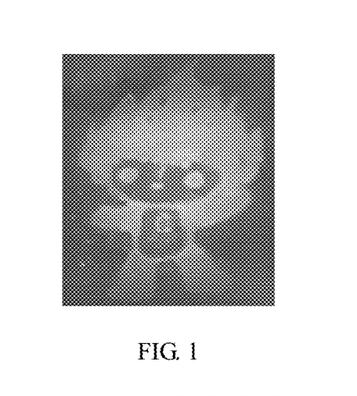
FIG. 1 is a holographic image obtained in Embodiment 6 of the present disclosure.
Figure 2:
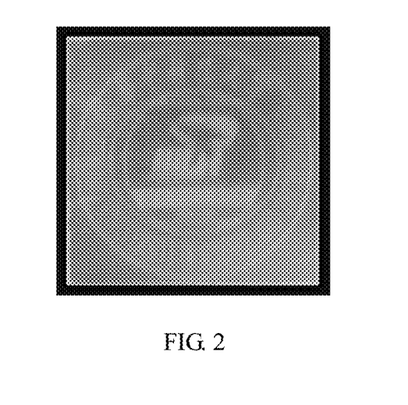
FIG. 2 is a fluorescent image obtained in Embodiment 6 of the present disclosure.

The precursor of the dual image storage material was irradiated with a coherent laser of 503 nanometer for 40 seconds to cause free radical polymerization of the monofunctional monomers and the polyfunctional monomers so as to obtain a holographic material in which a holographic image (as shown in FIG. 1) is stored. Subsequently, the holographic material was irradiated with ultraviolet light through a mask for 14 minutes to obtain a dual image storage material in which a holographic image and a fluorescent pattern (as shown in FIG. 2) are both stored, in which the ultraviolet light has a wavelength of 278 nanometer and a light intensity of 70 milliwatts per square centimeter. Finally, the obtained dual image storage material was cured by irradiating it with ultraviolet light for 35 minutes to completely react the remaining photopolymerizable monomers so as to fix the images.

The holographic image is as shown in FIG. 1, and the fluorescent pattern is as shown in FIG. 2.

Embodiment 7

The dual image storage material according to the present disclosure can present a holographic pattern visible to the naked eyes under sunlight and a fluorescent pattern under ultraviolet light in the same spatial position of the material; the holographic pattern and the fluorescent pattern can be the same or different; the holographic pattern may be a two-dimensional image or a three-dimensional image, which can be observed with the naked eyes under sunlight.

The dual image storage material was obtained by selective photoreaction of 15 parts by weight of an organic fluorescent material, 36 parts by weight of liquid crystal, 0.6 parts by weight of a photoinitiator and 49 parts by weight of photopolymerizable monomers.

The photopolymerizable monomers are a mixture of monofunctional monomers and polyfunctional monomers in a mass ratio of 12:11. The monofunctional monomers are a mixture of N,N-dimethylacrylamide and acrylic acid. The polyfunctional monomers are a mixture of ethylene dimethacrylate, pentaerythritol triacrylate and pentaerythritol tetraacrylate.

The organic fluorescent material is a mixture of TPE and 1,2,3,4,5-pentaphenyl-1H-pyrrole, in which the R group is 4-butoxy-[1,1'-biphenyl]-4'-carbonitrile (4OCB).

The liquid crystal is a mixture of 4'-heptyl-4-biphenylcarbonitrile (7CB) and 4'-(octyloxy)-4-biphenylcarbonitrile (8OCB).

The photoinitiator is a visible light initiator. The visible light initiator is a mixture of 3,3'-carbonylbis(7-diethylaminecoumarin) and anilinoacetic acid.

A preparation method for the image storage material is as follows.

First, the organic fluorescent material was added to a mixed solution of monomers and liquid crystal, a photoinitiator (a mixture of 3,3'-carbonylbis(7-diethylaminecoumarin) and anilinoacetic acid) was added to the solution, and then ultrasonic dispersion was performed at 55 degrees Celsius for 39 minutes, so that the photoinitiator and the organic fluorescent material are uniformly dispersed in the mixed solution of the monomers and the liquid crystal to obtain a precursor of a dual image storage material.

The precursor of the dual image storage material was irradiated with a coherent laser of 512 nanometer for 45 seconds to cause free radical polymerization of the monofunctional monomers and the polyfunctional monomers so as to obtain a holographic material in which a holographic image is stored. Subsequently, the holographic material was irradiated with ultraviolet light through a mask for 16 minutes to obtain a dual image storage material in which a holographic image and a fluorescent pattern are both stored, in which the ultraviolet light has a wavelength of 288 nanometer and a light intensity of 80 milliwatts per square centimeter. Finally, the obtained dual image storage material was cured by irradiating it with ultraviolet light for 40 minutes to completely react the remaining photopolymerizable monomers so as to fix the images.

Embodiment 8

The dual image storage material according to the present disclosure can present a holographic pattern visible to the naked eyes under sunlight and a fluorescent pattern under ultraviolet light in the same spatial position of the material; the holographic pattern and the fluorescent pattern can be the same or different; the holographic pattern may be a two-dimensional image or a three-dimensional image, which can be observed with the naked eyes under sunlight.

The dual image storage material was obtained by selective photoreaction of 17 parts by weight of an organic fluorescent material, 34 parts by weight of liquid crystal, 3 parts by weight of a photoinitiator and 49 parts by weight of photopolymerizable monomers.

The photopolymerizable monomers are a mixture of monofunctional monomers and polyfunctional monomers in a mass ratio of 1:1. The monofunctional monomers are a mixture of N,N-dimethylacrylamide and methacrylic acid. The polyfunctional monomers are a mixture of ethylene dimethacrylate, pentaerythritol tetraacrylate, and hyperbranched acrylate.

The organic fluorescent material is a mixture of TPE and HPS, in which the R group is hydrogen atom and n-hexyl.

The liquid crystal is a mixture of 4'-heptyl-4-biphenylcarbonitrile (7CB) and 4-butoxy-[1,1'-biphenyl]-4'-carbonitrile (4OCB).

The photoinitiator is an ultraviolet initiator. The ultraviolet initiator is a mixture of bis(2,6-dimethoxybenzoyl)(2,4,4-trimethylpentyl)-phosphine oxide and 2-hydroxy-2-methylpropiophenone.

A preparation method for the image storage material is as follows.

First, the organic fluorescent material was added to a mixed solution of monomers and liquid crystal, a photoinitiator (a mixture of bis(2,6-dimethoxybenzoyl)(2,4,4-trimethylpentyl)-phosphine oxide and 2-hydroxy-2-methylpropiophenone mixture) was added to the solution, and then ultrasonic dispersion was performed at 60 degrees Celsius for 36 minutes, so that the photoinitiator and the organic fluorescent material are uniformly dispersed in the mixed solution of the monomers and the liquid crystal to obtain a precursor of a dual image storage material.

The precursor of the dual image storage material was irradiated with a coherent laser of 527 nanometer for 50 seconds to cause free radical polymerization of the monofunctional monomers and the polyfunctional monomers so as to obtain a holographic material in which a holographic image is stored. Subsequently, the holographic material was irradiated with ultraviolet light through a mask for 18 minutes to obtain a dual image storage material in which a holographic image and a fluorescent pattern are both stored, in which the ultraviolet light has a wavelength of 296 nanometer and a light intensity of 90 milliwatts per square centimeter. Finally, the obtained dual image storage material was cured by irradiating it with ultraviolet light for 45 minutes to completely react the remaining photopolymerizable monomers so as to fix the images.

Embodiment 9

The dual image storage material according to the present disclosure can present a holographic pattern visible to the naked eyes under sunlight and a fluorescent pattern under ultraviolet light in the same spatial position of the material; the holographic pattern and the fluorescent pattern can be the same or different; the holographic pattern may be a two-dimensional image or a three-dimensional image, which can be observed with the naked eyes under sunlight.

The dual image storage material was obtained by selective photoreaction of 19 parts by weight of an organic fluorescent material, 32 parts by weight of liquid crystal, 4 parts by weight of a photoinitiator and 49 parts by weight of photopolymerizable monomers.

The photopolymerizable monomers are a mixture of monofunctional monomers and polyfunctional monomers in a mass ratio of 12:13. The monofunctional monomers are a mixture of 2-hydroxyethyl acrylate and 2-hydroxyethyl methacrylate. The polyfunctional monomers are a mixture of ethylene dimethacrylate, hyperbranched acrylate, and pentaerythritol triacrylate.

The organic fluorescent material is a mixture of TPE and THBA, in which the R group is hydrogen atom and n-amyl.

The liquid crystal is a mixture of 4-cyano-4'-pentylbiphenyl (5CB) and 4'-(octyloxy)-4-biphenylcarbonitrile (8OCB).

The photoinitiator is a visible light initiator. The visible light initiator is a mixture of acid red 94 and anilinoacetic acid.

A preparation method for the image storage material is as follows.

First, the organic fluorescent material was added to a mixed solution of monomers and liquid crystal, a photoinitiator (a mixture of acid red 94 and anilinoacetic acid) was added to the solution, and then ultrasonic dispersion was performed at 65 degrees Celsius for 33 minutes, so that the photoinitiator and the organic fluorescent material are uniformly dispersed in the mixed solution of the monomers and the liquid crystal to obtain a precursor of a dual image storage material.

The precursor of the dual image storage material was irradiated with a coherent laser of 535 nanometer for 12 seconds to cause free radical polymerization of the monofunctional monomers and the polyfunctional monomers so as to obtain a holographic material in which a holographic image is stored. Subsequently, the holographic material was irradiated with ultraviolet light through a mask for 20 minutes to obtain a dual image storage material in which a holographic image and a fluorescent pattern are both stored, in which the ultraviolet light has a wavelength of 300 nanometer and a light intensity of 100 milliwatts per square centimeter. Finally, the obtained dual image storage material was cured by irradiating it with ultraviolet light for 50 minutes to completely react the remaining photopolymerizable monomers so as to fix the images.

Embodiment 10

The dual image storage material according to the present disclosure can present a holographic pattern visible to the naked eyes under sunlight and a fluorescent pattern under ultraviolet light in the same spatial position of the material; the holographic pattern and the fluorescent pattern can be the same or different; the holographic pattern may be a two-dimensional image or a three-dimensional image, which can be observed with the naked eyes under sunlight.

The dual image storage material was obtained by selective photoreaction of 21 parts by weight of an organic fluorescent material, 30 parts by weight of liquid crystal, 5 parts by weight of a photoinitiator and 49 parts by weight of photopolymerizable monomers.

The photopolymerizable monomers are a mixture of monofunctional monomers and polyfunctional monomers in a mass ratio of 6:7. The monofunctional monomers are a mixture of 2-hydroxyethyl acrylate and acrylic acid. The polyfunctional monomers are a mixture of pentaerythritol triacrylate, pentaerythritol tetraacrylate and hyperbranched acrylate.

The organic fluorescent material is a mixture of TPE and DSA, in which the R group is hydrogen atom and citronellol group.

The liquid crystal is a mixture of 4-cyano-4'-pentylbiphenyl (5CB) and 4-butoxy-[1,1'-biphenyl]-4'-carbonitrile (4OCB).

The photoinitiator is an ultraviolet initiator. The ultraviolet initiator is a mixture of bis(2,6-dimethoxybenzoyl)(2,4,4-trimethylpentyl)-phosphine oxide and 2-hydroxy-2-methylpropiophenone.

A preparation method for the image storage material is as follows.

First, the organic fluorescent material was added to a mixed solution of monomers and liquid crystal, a photoinitiator (a mixture of bis(2,6-dimethoxybenzoyl)(2,4,4-trimethylpentyl)-phosphine oxide and 2-hydroxy-2-methylpropiophenone) was added to the solution, and then ultrasonic dispersion was performed at 70 degrees Celsius for 30 minutes, so that the photoinitiator and the organic fluorescent material are uniformly dispersed in the mixed solution of the monomers and the liquid crystal to obtain a precursor of a dual image storage material.

The precursor of the dual image storage material was irradiated with a coherent laser of 549 nanometer for 17 seconds to cause free radical polymerization of the monofunctional monomers and the polyfunctional monomers so as to obtain a holographic material in which a holographic image is stored. Subsequently, the holographic material was irradiated with ultraviolet light through a mask for 22 minutes to obtain a dual image storage material in which a holographic image and a fluorescent pattern are both stored, in which the ultraviolet light has a wavelength of 310 nanometer and a light intensity of 110 milliwatts per square centimeter. Finally, the obtained dual image storage material was cured by irradiating it with ultraviolet light for 55 minutes to completely react the remaining photopolymerizable monomers so as to fix the images.

Embodiment 11

The dual image storage material according to the present disclosure can present a holographic pattern visible to the naked eyes under sunlight and a fluorescent pattern under ultraviolet light in the same spatial position of the material; the holographic pattern and the fluorescent pattern can be the same or different; the holographic pattern may be a two-dimensional image or a three-dimensional image, which can be observed with the naked eyes under sunlight.

The dual image storage material was obtained by selective photoreaction of 23 parts by weight of an organic fluorescent material, 28 parts by weight of liquid crystal, 6 parts by weight of a photoinitiator and 49 parts by weight of photopolymerizable monomers.

The photopolymerizable monomers are a mixture of monofunctional monomers and polyfunctional monomers in a mass ratio of 4:5. The monofunctional monomers are a mixture of 2-hydroxyethyl acrylate and methacrylic acid. The polyfunctional monomers are a mixture of pentaerythritol triacrylate and pentaerythritol tetraacrylate.

The organic fluorescent material is a mixture of TPE and PDAB, in which the R group is hydrogen atom and 4'-heptyl-4-biphenylcarbonitrile (7CB).

The liquid crystal is a mixture of 4'-(octyloxy)-4-biphenylcarbonitrile (8OCB) and 4-butoxy-[1,1'-biphenyl]-4'-carbonitrile (4OCB).

The photoinitiator is a visible light initiator. The visible light initiator is bis(2,6-difluoro-3-(1-hydropyrrol-1-yl)phenyl)titanocene.

A preparation method for the image storage material is as follows.

First, the organic fluorescent material was added to a mixed solution of monomers and liquid crystal, a photoinitiator (bis(2,6-difluoro-3-(1-hydropyrrol-1-yl)phenyl)titanocene) was added to the solution, and then ultrasonic dispersion was performed at 75 degrees Celsius for 27 minutes, so that the photoinitiator and the organic fluorescent material are uniformly dispersed in the mixed solution of the monomers and the liquid crystal to obtain a precursor of a dual image storage material.

The precursor of the dual image storage material was irradiated with a coherent laser of 553 nanometer for 23 seconds to cause free radical polymerization of the monofunctional monomers and the polyfunctional monomers so as to obtain a holographic material in which a holographic image is stored. Subsequently, the holographic material was irradiated with ultraviolet light through a mask for 24 minutes to obtain a dual image storage material in which a holographic image and a fluorescent pattern are both stored, in which the ultraviolet light has a wavelength of 325 nanometer and a light intensity of 120 milliwatts per square centimeter. Finally, the obtained dual image storage material was cured by irradiating it with ultraviolet light for 60 minutes to completely react the remaining photopolymerizable monomers so as to fix the images.

Embodiment 12

The dual image storage material according to the present disclosure can present a holographic pattern visible to the naked eyes under sunlight and a fluorescent pattern under ultraviolet light in the same spatial position of the material; the holographic pattern and the fluorescent pattern can be the same or different; the holographic pattern may be a two-dimensional image or a three-dimensional image, which can be observed with the naked eyes under sunlight.

The dual image storage material was obtained by selective photoreaction of 25 parts by weight of an organic fluorescent material, 26 parts by weight of liquid crystal, 7 parts by weight of a photoinitiator and 49 parts by weight of photopolymerizable monomers.

The photopolymerizable monomers are a mixture of monofunctional monomers and polyfunctional monomers in a mass ratio of 3:4. The monofunctional monomers are a mixture of 2-hydroxyethyl methacrylate and acrylic acid. The polyfunctional monomers are a mixture of pentaerythritol triacrylate and hyperbranched acrylate.

The organic fluorescent material is a mixture of TPE and benzhydrylidenefluorene, in which the R group is hydrogen atom and 4'-(octyloxy)-4-biphenylcarbonitrile (8OCB).

The liquid crystal is 4'-heptyl-4-biphenylcarbonitrile (7CB).

The photoinitiator is an ultraviolet initiator. The ultraviolet initiator is a mixture of bis(2,6-dimethoxybenzoyl)(2,4,4-trimethylpentyl)-phosphine oxide and 2-hydroxy-2-methylpropiophenone.

A preparation method for the image storage material is as follows.

First, the organic fluorescent material was added to a mixed solution of monomers and liquid crystal, a photoinitiator (a mixture of bis(2,6-dimethoxybenzoyl)(2,4,4-trimethylpentyl)-phosphine oxide and 2-hydroxy-2-methylpropiophenone) was added to the solution, and then ultrasonic dispersion was performed at 85 degrees Celsius for 24 minutes, so that the photoinitiator and the organic fluorescent material are uniformly dispersed in the mixed solution of the monomers and the liquid crystal to obtain a precursor of a dual image storage material.

The precursor of the dual image storage material was irradiated with a coherent laser of 560 nanometer for 28 seconds to cause free radical polymerization of the monofunctional monomers and the polyfunctional monomers so as to obtain a holographic material in which a holographic image is stored. Subsequently, the holographic material was irradiated with ultraviolet light through a mask for 26 minutes to obtain a dual image storage material in which a holographic image and a fluorescent pattern are both stored, in which the ultraviolet light has a wavelength of 334 nanometer and a light intensity of 130 milliwatts per square centimeter. Finally, the obtained dual image storage material was cured by irradiating it with ultraviolet light for 5 minutes to completely react the remaining photopolymerizable monomers so as to fix the images.

Embodiment 13

The dual image storage material according to the present disclosure can present a holographic pattern visible to the naked eyes under sunlight and a fluorescent pattern under ultraviolet light in the same spatial position of the material; the holographic pattern and the fluorescent pattern can be the same or different; the holographic pattern may be a two-dimensional image or a three-dimensional image, which can be observed with the naked eyes under sunlight.

The dual image storage material was obtained by selective photoreaction of 27 parts by weight of an organic fluorescent material, 24 parts by weight of liquid crystal, 8 parts by weight of a photoinitiator and 49 parts by weight of photopolymerizable monomers.

The photopolymerizable monomers are a mixture of monofunctional monomers and polyfunctional monomers in a mass ratio of 12:17. The monofunctional monomers are a mixture of 2-hydroxyethyl methacrylate and methacrylic acid. The polyfunctional monomers are a mixture of pentaerythritol tetraacrylate and hyperbranched acrylate.

The organic fluorescent material is a mixture of 1,2,3,4,5-pentaphenyl-1H-pyrrole and HPS, in which the R group is hydrogen atom and 4-cyano-4'-pentylbiphenyl (5CB).

The liquid crystal is 4-cyano-4'-pentylbiphenyl (5CB).

The photoinitiator is a visible light initiator. The visible light initiator is a mixture of 3,3'-carbonylbis(7-diethylaminecoumarin) and anilinoacetic acid.

A preparation method for the image storage material is as follows.

First, the organic fluorescent material was added to a mixed solution of monomers and liquid crystal, a photoinitiator (a mixture of 3,3'-carbonylbis(7-diethylaminecoumarin) and anilinoacetic acid) was added to the solution, and then ultrasonic dispersion was performed at 85 degrees Celsius for 21 minutes, so that the photoinitiator and the organic fluorescent material are uniformly dispersed in the mixed solution of the monomers and the liquid crystal to obtain a precursor of a dual image storage material.

The precursor of the dual image storage material was irradiated with a coherent laser of 579 nanometer for 31 seconds to cause free radical polymerization of the monofunctional monomers and the polyfunctional monomers so as to obtain a holographic material in which a holographic image is stored. Subsequently, the holographic material was irradiated with ultraviolet light through a mask for 28 minutes to obtain a dual image storage material in which a holographic image and a fluorescent pattern are both stored, in which the ultraviolet light has a wavelength of 345 nanometer and a light intensity of 140 milliwatts per square centimeter. Finally, the obtained dual image storage material was cured by irradiating it with ultraviolet light for 10 minutes to completely react the remaining photopolymerizable monomers so as to fix the images.

Embodiment 14

The dual image storage material according to the present disclosure can present a holographic pattern visible to the naked eyes under sunlight and a fluorescent pattern under ultraviolet light in the same spatial position of the material; the holographic pattern and the fluorescent pattern can be the same or different; the holographic pattern may be a two-dimensional image or a three-dimensional image, which can be observed with the naked eyes under sunlight.

The dual image storage material was obtained by selective photoreaction of 50 parts by weight of an organic fluorescent material, 7 parts by weight of liquid crystal, 10 parts by weight of a photoinitiator and 43 parts by weight of photopolymerizable monomers.

The photopolymerizable monomers are a mixture of monofunctional monomers and polyfunctional monomers in a mass ratio of 1:2. The monofunctional monomers are a mixture of acrylic acid and methacrylic acid. The polyfunctional monomers are ethylene dimethacrylate.

The organic fluorescent material is a mixture of 1,2,3,4,5-pentaphenyl-1H-pyrrole and THBA, in which the R group is hydrogen atom and 4-butoxy-[1,1'-biphenyl]-4'-carbonitrile (4OCB).

The liquid crystal is 4'-(octyloxy)-4-biphenylcarbonitrile (8OCB).

The photoinitiator is an ultraviolet initiator. The ultraviolet initiator is a mixture of bis(2,6-dimethoxybenzoyl)(2,4,4-trimethylpentyl)-phosphine oxide and 2-hydroxy-2-methylpropiophenone.

A preparation method for the image storage material is as follows.

First, the organic fluorescent material was added to a mixed solution of monomers and liquid crystal, a photoinitiator (a mixture of bis(2,6-dimethoxybenzoyl)(2,4,4-trimethylpentyl)-phosphine oxide and 2-hydroxy-2-methylpropiophenone) was added to the solution, and then ultrasonic dispersion was performed at 90 degrees Celsius for 18 minutes, so that the photoinitiator and the organic fluorescent material are uniformly dispersed in the mixed solution of the monomers and the liquid crystal to obtain a precursor of a dual image storage material.

The precursor of the dual image storage material was irradiated with a coherent laser of 580 nanometer for 37 seconds to cause free radical polymerization of the monofunctional monomers and the polyfunctional monomers so as to obtain a holographic material in which a holographic image is stored. Subsequently, the holographic material was irradiated with ultraviolet light through a mask for 30 minutes to obtain a dual image storage material in which a holographic image and a fluorescent pattern are both stored, in which the ultraviolet light has a wavelength of 356 nanometer and a light intensity of 150 milliwatts per square centimeter. Finally, the obtained dual image storage material was cured by irradiating it with ultraviolet light for 15 minutes to completely react the remaining photopolymerizable monomers so as to fix the images.

TABLE 1

Formulations related to other exemplary embodiments of the present disclosure

| Embodiment | Organic fluorescent material (parts by weight) | Liquid crystal (parts by weight) | Photoinitiator (parts by weight) | Photopolymerizable monomer (parts by weight) | Photopolymerizable monomer (ratio) |
|---|---|---|---|---|---|
| 16 | 31 | 20 | 9 | 49 | 12:19 |
| 17 | 33 | 18 | 1.5 | 49 | 3:5 |
| 18 | 35 | 16 | 2.5 | 49 | 12:21 |
| 19 | 37 | 14 | 3.5 | 49 | 6:11 |
| 20 | 39 | 12 | 4.5 | 49 | 12:23 |
| 21 | 41 | 10 | 6.5 | 49 | 2:3 |
| 22 | 43 | 8 | 7.5 | 49 | 6:7 |
| 23 | 45 | 22 | 8.5 | 33 | 4:5 |
| 24 | 47 | 9 | 9.5 | 44 | 3:4 |
| 25 | 49 | 11 | 0.5 | 40 | 12:17 |
| 26 | 29 | 13 | 1.1 | 58 | 2:3 |
| 27 | 48 | 15 | 2.2 | 37 | 12:19 |

TABLE 1-continued

Formulations related to other exemplary embodiments of the present disclosure

| | | | | | |
|---|---|---|---|---|---|
| 28 | 46 | 17 | 3.4 | 37 | 3:5 |
| 29 | 44 | 19 | 7.8 | 37 | 12:21 |
| 30 | 12 | 21 | 8.2 | 67 | 6:11 |

| Embodiment | Monofunctional monomer | Polyfunctional monomer |
|---|---|---|
| 16 | N,N-dimethylacrylamide, 2-hydroxyethyl acrylate, 2-hydroxyethyl methacrylate | Pentaerythritol triacrylate |
| 17 | N,N-dimethylacrylamide, 2-hydroxyethyl acrylate, Acrylic acid | Pentaerythritol tetraacrylate |
| 18 | N,N-dimethylacrylamide, 2-hydroxyethyl acrylate, Methacrylic acid | Hyperbranched acrylate |
| 19 | N,N-dimethylacrylamide, 2-hydroxyethyl methacrylate, Acrylic acid | Ethylene dimethacrylate, Pentaerythritol triacrylate |
| 20 | N,N-dimethylacrylamide, 2-hydroxyethyl methacrylate, Methacrylic acid | Ethylene dimethacrylate, Pentaerythritol tetraacrylate |
| 21 | N,N-dimethylacrylamide, Acrylic acid, Methacrylic acid | Ethylene dimethacrylate, Hyperbranched acrylate |
| 22 | 2-hydroxyethyl acrylate, 2-hydroxyethyl methacrylate, Acrylic acid | Ethylene dimethacrylate, Pentaerythritol triacrylate, Pentaerythritol tetraacrylate |
| 23 | 2-hydroxyethyl acrylate, 2-hydroxyethyl methacrylate, Methacrylic acid | Ethylene dimethacrylate, Pentaerythritol tetraacrylate, Hyperbranched acrylate |
| 24 | 2-hydroxyethyl methacrylate, Acrylic acid, Methacrylic acid | Ethylene dimethacrylate, Hyperbranched acrylate, Pentaerythritol triacrylate |
| 25 | 2-hydroxyethyl acrylate, Acrylic acid, Methacrylic acid | Pentaerythritol triacrylate, Pentaerythritol tetraacrylate, Hyperbranched acrylate |
| 26 | N,N-dimethylacrylamide | Pentaerythritol triacrylate, Pentaerythritol tetraacrylate |
| 27 | 2-hydroxyethyl acrylate | Pentaerythritol triacrylate, Hyperbranched acrylate |
| 28 | 2-hydroxyethyl methacrylate | Pentaerythritol tetraacrylate, Hyperbranched acrylate |
| 29 | Acrylic acid | Ethylene dimethacrylate |
| 30 | Methacrylic acid | Pentaerythritol triacrylate |

| Embodiment | Organic fluorescent material | R group | Liquid crystal |
|---|---|---|---|
| 16 | 1,2,3,4,5-pentaphenyl-1H-pyrrole, DSA | N-hexyl, N-amyl | 4-butoxy-[1,1'-biphenyl]-4'-carbonitrile (4OCB) |
| 17 | 1,2,3,4,5-pentaphenyl-1H-pyrrole, PDAB | N-hexyl, Citronellol group | Biphenylcyanogen liquid crystal mixture (E7) |
| 18 | 1,2,3,4,5-pentaphenyl-1H-pyrrole, Benzhydrylidenefluorene | N-hexyl, 4'-heptyl-4-biphenylcarbonitrile (7CB) | Biphenylcyanogen liquid crystal mixture (P0616A) |
| 19 | HPS, THBA | N-hexyl, 4'-(octyloxy)-4-biphenylcarbonitrile (8OCB) | 4'-heptyl-4-biphenylcarbonitrile (7CB), 4-cyano-4'-pentylbiphenyl (5CB) |
| 20 | HPS, DSA | N-hexyl, 4-cyano-4'-pentylbiphenyl (5CB) | 4'-heptyl-4-biphenylcarbonitrile (7CB), 4'-(octyloxy)-4-biphenylcarbonitrile (8OCB) |
| 21 | HPS, PDAB | N-hexyl, 4-butoxy-[1,1'-biphenyl]-4'-carbonitrile (4OCB) | 4'-heptyl-4-biphenylcarbonitrile (7CB), 4-butoxy-[1,1'-biphenyl]-4'-carbonitrile (4OCB) |
| 22 | HPS, Benzhydrylidenefluorene | N-amyl, Citronellol group | 4-cyano-4'-pentylbiphenyl (5CB), 4'-(octyloxy)-4-biphenylcarbonitrile (8OCB) |
| 23 | THBA, DSA | N-amyl, 4'-heptyl-4-biphenylcarbonitrile (7CB) | 4-cyano-4'-pentylbiphenyl (5CB), 4-butoxy-[1,1'-biphenyl]-4'-carbonitrile (4OCB) |
| 24 | THBA, PDAB | N-amyl, 4'-(octyloxy)-4-biphenylcarbonitrile (8OCB) | 4'-(octyloxy)-4-biphenylcarbonitrile (8OCB), 4-butoxy-[1,1'-biphenyl]-4'-carbonitrile (4OCB) |
| 25 | THBA, Benzhydrylidenefluorene | N-amyl, 4-cyano-4'-pentylbiphenyl (5CB) | Biphenylcyanogen liquid crystal mixture (E7) |
| 26 | DSA, PDAB | N-amyl, 4-butoxy-[1,1'-biphenyl]-4'-carbonitrile (4OCB) | Biphenylcyanogen liquid crystal mixture (P0616A) |
| 27 | DSA, Benzhydrylidenefluorene | Citronellol group, 4-cyano-4'-pentylbiphenyl (5CB) | Biphenylcyanogen liquid crystal mixture (E7) |

TABLE 1-continued

Formulations related to other exemplary embodiments of the present disclosure

| | | | |
|---|---|---|---|
| 28 | PDAB, Benzhydrylidenefluorene | Citronellol group, 4-butoxy-[1,1'-biphenyl]-4'-carbonitrile (4OCB) | Biphenylcyanogen liquid crystal mixture (P0616A) |
| 29 | TPE | hydrogen atom | 4'-heptyl-4-biphenylcarbonitrile (7CB) |
| 30 | 1,2,3,4,5-pentaphenyl-1H-pyrrole | N-hexyl | 4-cyano-4'-pentylbiphenyl (5CB) |

| Embodiment | Photoinitiator |
|---|---|
| 16 | Visible light initiator (mixture of acid red 94 and anilinoacetic acid) |
| 17 | Ultraviolet initiator (mixture of bis(2,6-dimethoxybenzoyl)(2,4,4-trimethylpentyl)-phosphine oxide and 2-hydroxy-2-methylpropiophenone) |
| 18 | Visible light initiator (bis(2,6-difluoro-3-(1-hydropyrrol-1-yl)phenyl)titanocene) |
| 19 | Ultraviolet initiator (mixture of bis(2,6-dimethoxybenzoyl)(2,4,4-trimethylpentyl)-phosphine oxide and 2-hydroxy-2-methylpropiophenone) |
| 20 | Visible light initiator (mixture of 3,3'-carbonylbis(7-diethylaminocoumarin)) and anilinoacetic acid) |
| 21 | Ultraviolet initiator (mixture of bis(2,6-dimethoxybenzoyl)(2,4,4-trimethylpentyl)-phosphine oxide and 2-hydroxy-2-methylpropiophenone) |
| 22 | Visible light initiator (mixture of acid red 94 and anilinoacetic acid) |
| 23 | Ultraviolet initiator (mixture of bis(2,6-dimethoxybenzoyl)(2,4,4-trimethylpentyl)-phosphine oxide and 2-hydroxy-2-methylpropiophenone) |
| 24 | Visible light initiator (bis(2,6-difluoro-3-(1-hydropyrrol-1-yl)phenyl)titanocene) |
| 25 | Ultraviolet initiator (mixture of bis(2,6-dimethoxybenzoyl)(2,4,4-trimethylpentyl)-phosphine oxide and 2-hydroxy-2-methylpropiophenone) |
| 26 | Visible light initiator (mixture of 3,3'-carbonylbis(7-diethylaminocoumarin)) and anilinoacetic acid) |
| 27 | Ultraviolet initiator (mixture of bis(2,6-dimethoxybenzoyl)(2,4,4-trimethylpentyl)-phosphine oxide and 2-hydroxy-2-methylpropiophenone) |
| 28 | Visible light initiator (mixture of Acid red 94 and anilinoacetic acid) |
| 29 | Ultraviolet initiator (mixture of bis(2,6-dimethoxybenzoyl)(2,4,4-trimethylpentyl)-phosphine oxide and 2-hydroxy-2-methylpropiophenone) |
| 30 | Visible light initiator (mixture of acid red 94 and anilinoacetic acid) |

| Examples | Mixing temperature (degrees Celsius) | Mixing time (minutes) | Coherent laser wavelength (nanometer) | Coherent laser time (second) | Ultraviolet wavelength (nanometer) | Ultraviolet light intensity (milliwatts per square centimeter) | Ultraviolet light time (minutes) | Post-cure time (minutes) | Post-cure mode |
|---|---|---|---|---|---|---|---|---|---|
| 16 | 20 | 60 | 432 | 10 | 200 | 10 | 2 | 5 | Ultraviolet light |
| 17 | 25 | 57 | 441 | 15 | 211 | 20 | 4 | 10 | Visible light |
| 18 | 30 | 54 | 456 | 20 | 223 | 30 | 6 | 15 | Ultraviolet light |
| 19 | 35 | 51 | 462 | 25 | 245 | 40 | 8 | 20 | Visible light |
| 20 | 40 | 48 | 478 | 30 | 254 | 50 | 10 | 25 | Ultraviolet light |
| 21 | 45 | 45 | 495 | 35 | 266 | 60 | 12 | 30 | Visible light |
| 22 | 50 | 42 | 503 | 40 | 278 | 70 | 14 | 35 | Ultraviolet light |
| 23 | 55 | 39 | 512 | 45 | 288 | 80 | 16 | 40 | Visible light |
| 24 | 60 | 36 | 527 | 50 | 296 | 90 | 18 | 45 | Ultraviolet light |
| 25 | 65 | 33 | 535 | 12 | 300 | 100 | 20 | 50 | Visible light |
| 26 | 70 | 30 | 549 | 17 | 310 | 110 | 22 | 55 | Ultraviolet light |
| 27 | 75 | 27 | 553 | 23 | 325 | 120 | 24 | 60 | Visible light |
| 28 | 80 | 24 | 560 | 28 | 334 | 130 | 26 | 5 | Ultraviolet light |
| 29 | 85 | 21 | 579 | 31 | 345 | 140 | 28 | 10 | Visible light |
| 30 | 90 | 18 | 580 | 37 | 356 | 150 | 30 | 15 | Ultraviolet light |

It should be readily understood to those skilled in the art that the above description is only preferred embodiments of the present disclosure, and does not limit the scope of the present disclosure. Any change, equivalent substitution and modification made without departing from the spirit and scope of the present disclosure should be included within the scope of the protection of the present disclosure.

What is claimed is:
1. A dual image storage material, wherein the dual image storage material is obtained by selective photoreaction of a composition comprising:
   an organic fluorescent material,
   a liquid crystal,
   a photoinitiator, and
   a photopolymerizable monomer, wherein the photopolymerizable monomer is a mixture of a monofunctional monomer and a polyfunctional monomer, the monofunctional monomer has a single carbon-carbon double bond, and the polyfunctional monomer has multiple carbon-carbon double bonds, the organic fluorescent material includes one or more compounds selected from the group consisting of substituted 1,1,2,2-tetraphenylethene (TPE), substituted 1,1,2,3,4,5-pentaphenyl-1H-pyrrole, substituted 1,1,2,3,4,5-hexaphenyl-1H-silole (HPS), substituted 9,10-di[(E)-styryl]anthracene (DSA), substituted 10,10',11,11'-tetrahydro-5,5'-bidibenzo[a,d][7]annulenylidene (THBA), substituted benzhydrylidenefluorene, and substituted 2,2'-(2,6-diphenylanthracene-9,10-diylidene)dimalononitrile (PDAB), substituted DSA substituted THBA where the substituent groups R in the structural formulae are each independently selected from the group consisting of n-hexyl, n-amyl, citronellol group, 4'-heptyl-4-biphenylcarbonitrile, 4'-(octyloxy)-4-biphenylcarbonitrile, 4-cyano-4'-pentylbiphenyl, and 4-butoxy-[1,1'-biphenyl]-4'-carbonitrile.

2. The dual image storage material according to claim 1, wherein the dual image storage material is obtained by selective photoreaction of 1 to 50 parts by weight of the organic fluorescent material, 7 to 50 parts by weight of the liquid crystal, 0.2 to 10 parts by weight of the photoinitiator and 33 to 67 parts by weight of the photopolymerizable monomer.

3. The dual image storage material according to claim 2, wherein the monofunctional monomer and the polyfunctional monomer are mixed in a mass ratio of 3:1 to 1:2;

the monofunctional monomer comprises one or more of N,N-dimethylacrylamide, 2-hydroxyethyl acrylate, 2-hydroxyethyl methacrylate, acrylic acid, and methacrylic acid; and the polyfunctional monomer comprises one or more of ethylene dimethacrylate, pentaerythritol triacrylate, pentaerythritol tetraacrylate, and hyperbranched acrylate.

4. The dual image storage material according to claim 2, wherein the liquid crystal is one or more of 4'-heptyl-4-biphenylcarbonitrile, 4-cyano-4'-pentylbiphenyl, 4'-(octyloxy)-4-biphenylcarbonitrile, 4-butoxy-[1,1'-biphenyl]-4'-carbonitrile, biphenylcyanogen liquid crystal mixture E7 and biphenylcyanogen liquid crystal mixture P0616A.

5. The dual image storage material according to claim 2, wherein the photoinitiator is an ultraviolet initiator or a visible light initiator or a combination thereof;

the visible light initiator is bis(2,6-difluoro-3-(1-hydropyrrol-1-yl)phenyl)titanocene, a mixture of 3,3'-carbonylbis(7-diethylaminocoumarin) and N-phenylglycine, or a mixture of Rose Bengal disodium salt and N-phenylglycine; and the ultraviolet initiator is a mixture of bis(2,6-dimethoxybenzoyl)(2,4,4-trimethylpentyl)-phosphine oxide and 2-hydroxy-2-methylpropiophenone.

6. The dual image storage material according to claim 1, wherein the photoinitiator is a mixture of bis(2,6-dimethoxybenzoyl)(2,4,4-trimethylpentyl)-phosphine oxide and 2-hydroxy-2-methylpropiophenone.

7. The dual image storage material according to claim 1, wherein the photoinitiator includes an ultraviolet initiator and a visible light initiator, the visible light initiator is bis(2,6-difluoro-3-(1-hydropyrrolo-1-yl)phenyl)titanocene, a mixture of 3,3'-carbonylbis(7-diethylaminocoumarin) and N-phenylglycine, or a mixture of Rose Bengal disodium salt and N-phenylglycine; and the ultraviolet initiator is a mixture of bis(2,6-dimethoxybenzoyl)(2,4,4-trimethylpentyl)-phosphine oxide and 2-hydroxy-2-methylpropiophenone.

8. A preparation method for the dual image storage material according to claim 1, comprising:

(1) uniformly mixing 1 to 50 parts by weight of the organic fluorescent material, 7 to 50 parts by weight of the liquid crystal, 0.2 to 10 parts by weight of the photoinitiator and 33 to 67 parts by weight of the photopolymerizable monomer to obtain a precursor of the dual image storage material;

(2) packaging the precursor of the dual image storage material obtained in the step (1) in a liquid crystal cell, and irradiating it with a coherent laser to cause free radical polymerization of the photopolymerizable monomer, thereby obtaining a holographic material in which a hologram image is stored;

(3) irradiating the holographic material obtained in the step (2) with ultraviolet light through a mask to obtain a dual image storage material in which a holographic material and a fluorescence image are both stored, the mask being used for defining a pattern of the fluorescent image;

(4) postcuring the dual image storage material obtained in the step (3) by visible light or ultraviolet light to completely react the remaining photopolymerizable monomer so as to fix the images.

9. The preparation method according to claim 8, wherein the coherent laser in the step (2) has a wavelength of 432 to 633 nanometer and an irradiation time of 10 to 50 seconds.

10. The preparation method according to claim 8, wherein the ultraviolet light in the step (3) has a wavelength of 200 to 370 nanometer, an irradiation intensity of 10 to 200 milliwatts per square centimeter and an irradiation time of 2 to 60 minutes.

11. A method of forming a holographic/fluorescent dual pattern for optical anti-counterfeiting or optical information storage or display, comprising, obtaining the dual image storage material of claim 1 by holographically recording a two-dimensional holographic pattern or a three-dimensional holographic pattern and subsequently using a masked exposure to record a two dimensional fluorescent image, wherein the two-dimensional holographic pattern or three-dimensional holographic pattern or two-dimensional fluorescent image is visible to a naked eye under sunlight or ultraviolet light.

* * * * *